United States Patent Office 3,156,171
Patented Nov. 10, 1964

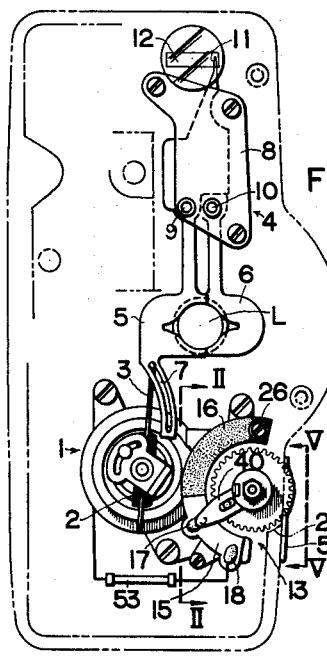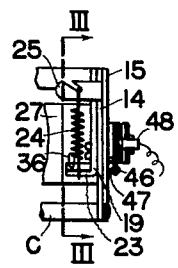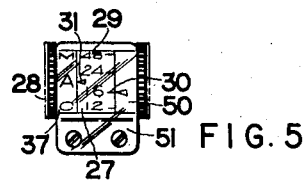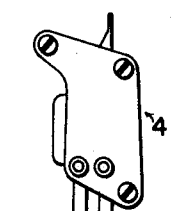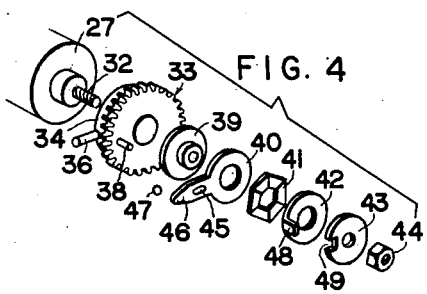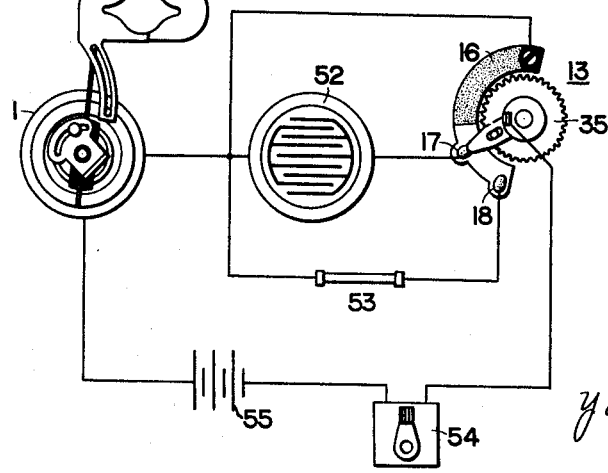

3,156,171
AUTOMATIC DIAPHRAGM CONTROL DEVICE
FOR PHOTOGRAPHIC CAMERA
Yoshinobu Sakaki, 5 Kikusaka-cho 1-chome, Chigusa-ku,
Nagoya, Japan
Filed Nov. 14, 1962, Ser. No. 237,605
Claims priority, application Japan, Nov. 19, 1961,
41,916/61
2 Claims. (Cl. 95—64)

This invention relates to an automatic diaphragm control device for a photographic camera.

There are known in the art various types of photographic cameras having a built-in exposure meter consisting of a photoconductor and a galvanometer, and a diaphragm whose aperture is controlled by the galvanometer in accordance with an amount of light falling upon the photoconductor and hence a brightness of an object to be photographed. In such a photographic camera it may be sometimes desired to check a source of electric current for energizing the diaphragm and to manually control the diaphragm.

A general object of the invention is to provide an improved automatic diaphragm control device for a photographic camera.

A more specific object of the invention is to provide an improved automatic diaphragm control device for a photographic camera including means for checking a source of electric current for energizing a diaphragm.

Another object of the invention is to provide an improved automatic diaphragm control device for a photographic camera including additionally means for manually controlling a diaphragm aperture.

With the aforesaid objects in view the invention resides in an automatic diaphragm control device for a photographic camera comprising diaphragm means, a source of electric current, a galvanometer driven by said source of electric current to control the diaphragm means, and photoconductive means for controlling a flow of current through the galvanometer in accordance with an amount of light falling upon the same, characterized by a variable resistance, said photoconductive means and a fixed resistance being in a circuit connecting said galvanometer and said source of electric current, switching means for selectively connecting said variable resistance, said photoconductive means and said fixed resistance to said galvanometer, resilient means, and means for manually holding said fixed resistance in connection with said galvanometer against the action of said resilient means, releasing of said manually holding means effecting automatically both disconnection of said fixed resistance from said galvanometer and connection of said photoconductive means to the same.

In order to easily check the extent to which said source of electric current has been consumed, said diaphragm means may preferably include an extension serving as an indicating pointer which can go in and out of the field of vision of a view finder to provide a measure of the consumption of said source of electric current.

The invention will become more readily apparent from the following detailed description taken in conjunction with the accompanying drawings in which:

FIG. 1 is a front view of an automatic diaphragm control device for a photographic camera constructed according to the teachings of the invention with the front face portion of the camera removed to illustrate the essential portions of the device;

FIG. 2 is an elevational side view as viewed on the line II—II of FIG. 1 in the direction of the arrows in FIG. 1;

FIG. 3 is a sectional view taken along the line III—III of FIG. 2;

FIG. 4 is an exploded view of a manual operating unit according to the teachings of the invention;

FIG. 5 is an elevational side view as viewed on the line V—V of FIG. 1 in the directions of the arrows in FIG. 1; and FIG. 6 is a circuit diagram of the electric circuit used with the device illustrated in FIG. 1.

Referring now to FIG. 1 of the drawings there is illustrated an automatic diaphragm control device for a photographic camera constructed in accordance with the teachings of the invention. A broken line designated by the reference character C indicates a camera housing the front face portion of which is removed in order to clearly illustrate the automatic diaphragm control device of the invention. A galvanometer 1 is suitably disposed within the housing C and includes a moving coil 2 provided with a control lever 3 attached thereto and rotatable therewith. The control lever 3 has its one end portion bent a right angle to its main body. A diaphragm device 4 comprising a pair of opposed diaphragm blades of the conventional construction 5 and 6 is disposed above the galvanometer 1 as viewed in FIG. 1. As shown in FIG. 1 the diaphragm blade 5 has on one side an elongated protrusion provided with an elongated slot 7 in which is engaged the bent end portion of the control lever 3. The pair of diaphragm blades 5 and 6 are pivotably carried on a supporting frame 8 rigidly secured to the housing C, at pivots 9 and 10 respectively and are operatively connected to each other through a slit-and-pin coupling or a gearing (not shown) in such a manner that, if the diaphragm blade 5 is rotated by the control lever 3 on the moving coil 2, both blades are rotated in bilateral symmetry with respect to an optical axis of a photographic lens L. Further the diaphragm blade 5 is provided on the other end with a projection extending in a direction opposite to the direction of the protrusion having the elongated slot 7. The projection terminates in an indicating pointer 11 adapted to engage a graduation 12 disposed within a bright field of vision of an optical view finder system (not shown) for a purpose which will become apparent hereinafter.

The invention contemplates selectively operating the diaphragm control device in automatic and manual fashions and also to provide means for checking a source of electric current for energizing the galvanometer 1. To this end, a manually operated change-over switch device generally designated by the reference numeral 13 is provided. The change-over switch device 13 consists broadly of a stationary unit and a rotatable unit. As shown in FIGS. 2 and 3, the stationary unit comprises a supporting frame 14 including a semi-circular segment suitably secured to the camera housing C and an electrically insulating plate 15 of any suitable electrically insulating material such as a phenolaldehyde resin having a similar shape to the semi-circular segment. The insulating plate 15 is attached to the outer surface of the semi-circular segment and has on the surface thereof facing away from the segment a carbon coating 16 serving as an electric resistor and a pair of electric contacts or an electric contact 17 for automatic diaphragm control and an electric contact 18 for checking a battery as will be described later. As shown in FIG. 1 the carbon contact 16 and the contacts 17 and 18 are electrically isolated from one another.

The stationary unit also includes a position adjuster 19 movable on the back side of the semi-circular segment as above described and along the same by a manually operated member as will be described hereinafter. As shown in FIGS. 2 and 3, this position adjuster 19 has a shape approximately a semi-circular segment and is provided along the central circular arc thereof with an arcuate opening 20 into which a pair of spaced guide pins 21 and 22 are fitted for the purpose of mounting the position adjuster 19 on the supporting frame 14. The position adjuster 19 has its lower end portion 23 bent rearward and engaging one end of a tensioning spring 24 having the other end hooked to a lug 25 on the support frame 14. The spring 24 serves to normally raise the position adjuster 19 to a position above which the same is prevented from lifting by the lower guide pin 22. In other word, the lower guide pin 22 serves also as a stop.

Along the axis passing through the center of the semi-circular stationary unit a rotatable unit is disposed as clearly shown in exploded form in FIG. 4. The reference numeral 27 designates a stationary member of circular cross section the periphery of which includes one portion appearing in a window 28 formed on the camera housing C. As shown in FIG. 3, the stationary member 27 may be preferably provided on this portion of its periphery with a series of frame numbers, a graduation 30 for indicating the number of frames and an index 31 provided for a manually operated member as will be described hereinafter.

The stationary member 27 includes on one end a stepped stem 32 projecting from the same and having its end portion of reduced diameter and screw-threaded. Loosely mounted on the thick portion of the stepped stem 32 is a manual operating member 33 consisting of a cylindrical portion 34 having its diameter substantially same as that of the stationary member 27 and a spur gear portion 35 contiguous to the same and somewhat larger in diameter than the cylindrical portion 34. The cylindrical portion 34 is provided on the periphery with a pin 36 radially projecting from the same and on and adjacent that portion of the periphery diametrically opposite to the pin 36 with the reference characters 37 such as "C," "A" and "M" meaning a checking position, an automatic position and a manual position respectively. The spur gear portion 36 includes an eccentric pin 38 parallel to the axis of the same.

Fitted upon the screw-threaded portion of the stepped stem 32 is a flanged bushing 39 of electrically insulating material on which are mounted a sliding ring of electrically conductive material 40, a spring washer of electrically conductive material 41 and a stationary washer of electrically conductive material 42. Then these conductive components are rigidly held in place on the insulating bushing 39 by a disk 43 of any suitable electrically insulating material such as a phenol-aldehyde resin and a nut 44 screwed on the threaded portion of the stepped stem 32. In order to rotate the sliding arm 46 projecting radially from ring 40 and the manually operated member 33 as one unit, the arm is provided with an opening 45 into which the pin 38 on the manually operated member 33 is fitted. The sliding arm 46 includes adjacent its free end a round protrusion serving to resiliently hold a small ball 47 between the same and the stationary semi-circular segment on which the arm 46 is adapted to slide.

The spring washer 41 has a plurality of radial ridges ensuring, when it is collapsed upon assembling, a good electrical connection between the sliding arm 46 and the stationary washer 42 through the conductive spring washer 41. The stationary washer 42 also is provided on the periphery with a bent lug 48 adapted to be fitted into a notch 49 formed on the insulating disk 43 whereby the insulating disk 43 is prevented from rotating relatively to the stationary washer 42. As seen in FIGS. 2 and 3, the pin 36 radially extending from the manually operated member 33 abuts against the bent portion 23 of the position adjuster 19.

Referring back to FIG. 5, a manually operated ring 50 is shown as being disposed adjacent the stationary member 27. This ring is connected to one end of a hair spring (not shown) in the galvanometer 1. The ring 50 can be rotated in accordance with the sensitivity of a photographic film and used to change the force of the hair spring acting on the moving coil 2 whereby the optimum stop is provided. It is to be understood that the components just described do not form a part of the invention. In FIG. 5, the reference numeral 51 designates a transparent cover covering the window 28.

The operation of the device thus far described will now be described with reference to FIG. 6 wherein an electric circuit used with the device is illustrated. The moving coil 2 of the galvanometer 1 is connected at one end directly to one end 26 of the carbon coating 16 on the semi-circular segment 15, to the contact 17 on the segment through a photoconductor cell 52 such as a cadmium sulfide cell or a phototransistor and to the contact 18 on the segment through a fixed resistor 53. The stationary washer 42 contacting the sliding arm 40 is connected to the other end of the moving coil 2 through a normally opened switch 54 and a battery 55 such as a mercury dry cell. Thus the carbon coating 16 as the resistor, the photoconductor cell 52 and the resistor 53 are effectively connected between the moving coil 2 of the galvanometer and the three poles of switch 54. It is very advantageous to interlock the switch 54 with a starting button for the photographic camera. Since the switch 54 is of the normally opened type any drain from the battery 55 is prevented when the camera is not used.

Assuming now that the components are in their respective positions illustrated in FIGS. 1 through 3, FIG. 5 and FIG. 6, the galvanometer 1 can be driven only by a flow of current through the photoconductor cell 52 whereby the diaphragm device 4 is automatically controlled in accordance with an amount of light falling upon the photoconductor cell 52 and in the well known manner.

In such a case, the extent to which the battery 55 has been consumed can readily be determined. To this end, an operator is required only to rotate the spur gear portion 35 of the manually operated member 33 in the counterclockwise direction as viewed in FIGS. 1 and 6 to maintain the same in the rotated position whereupon he looks into the view finder. More specifically, this rotation of the manually operated member 33 causes the position adjuster 19 to be rotated through the radial pin 36 on the cylindrical portion 34 until the upper extremity of the arcuate opening 20 abuts against the guide pin 21 against the action of the spring 25 (see FIG. 3). At the same time, the sliding arm 46 contacts the lowest contact 18 to drive the galvanometer 1 only by a flow of current through the resistor 53 to thereby move the diaphragm blades 5 and 6. Therefore, the indicating pointer 11 integral with the diaphragm blade 5 is displaced along the graduation 12 disposed in the field of vision of the view finder (not shown) and the position of the displaced pointer 11 relative to the graduation 12 provides a measure of the consumption of the battery 55.

When the spur gear portion 35 is released, the position adjuster 19 is returned to its original raised position as illustrated in FIG. 3 under the action of the spring 24. Thus the position for automatic diaphragm control operation is automatically re-established.

It may be sometimes desired to manually control the diaphragm device. In this case, the spur gear portion 35 of the manually operated member 33 can be manually rotated in the clockwise direction as viewed in FIGS. 1 and 6 to bring the sliding arm 46 into any suitable position on the carbon coating 16. Thus the galvanometer 1 is energized by the battery 55 in accordance with a value of variable resistance corresponding to that portion of the carbon coating extending from the one end 26 to the point thereof contacting the slide arm. Therefore, the diaphragm aperture is determined accordingly. It is noted that as the pin 36 on the cylindrical portion 34 is separated from the bent portion of the position adjuster 19 the sliding arm 46 is held in any desired position on the carbon coating 16 without being subjected to the action of the tensioning spring 24.

From the foregoing, it will be appreciated that the objects of the invention have been accomplished by the provision of switching means for selectively connecting a variable resistance, a photocell and a fixed resistance to a galvanometer for driving a diaphragm device and resilient means for automatically disconnecting fixed resistance from the galvanometer and connecting the photoconductor cell to the same. The invention is also advantageous in that since an extension of a diaphragm blade serving as a counterweight for the blade is utilized as an indicating pointer capable of going in and out of the field of vision of a view finder, an indication of diaphragm aperture can be readily observed with the construction for this purpose being simplified.

What I claim is:

1. In an automatic diaphragm control device for a photographic camera comprising diaphragm means, a source of electric current, and a galvanometer coupled to said diaphragm and to said source of current and driven by said source of electric current to control the diaphragm means, the combination of a photoconductive means for controlling a flow of current through the galvanometer in accordance with an amount of light falling upon the same, a variable resistance, and a fixed resistance and a common switching means connected in a circuit with said galvanometer and said source of electric current, said common switching means selectively connecting said variable resistance, said photoconductive means and said fixed resistance to said galvanometer, resilient means, and manual holding means coupled to said common switching means and to which said resilient means is connected for manually holding said fixed resistance in connection with said galvanometer against the action of said resilient means, releasing of said manual holding means effecting automatically both disconnection of said fixed resistance from said galvanometer and connection of said photoconductive means to the same, said variable resistance controlling manual operation of said diaphragm means.

2. In an automatic diaphragm control device for a photographic camera comprising diaphragm means, a source of electric current, and a galvanometer coupled to said diaphragm and to said source of current and driven by said source of electric current to control the diaphragm means, the combination of a photoconductive means for controlling a flow of current through the galvanometer in accordance with an amount of light falling upon the same, a variable resistance and a fixed resistance and a common switching means connected in a circuit with said galvanometer and said source of electric current, said common switching means selectively connecting said variable resistance, said photoconductive means and said fixed resistance to said galvanometer, resilient means, and manual holding means coupled to said common switching means and to which said resilient means is connected for manually holding said fixed resistance in connection with said galvanometer against the action of said resilient means, releasing of said manual holding means effecting automatically both disconnection of said fixed resistance from said galvanometer and connection of said photoconductive means to the same, said diaphragm means including an extension serving as an indicating pointer for providing a measure of the consumption of said source of electric current, said variable resistance controlling manual operation of said diaphragm means.

References Cited in the file of this patent

FOREIGN PATENTS

| | | |
|---|---|---|
| 1,056,470 | Germany | Apr 30, 1959 |
| 1,235,184 | France | May 23, 1960 |